(12) United States Patent
Carey

(10) Patent No.: US 7,001,291 B2
(45) Date of Patent: Feb. 21, 2006

(54) TRAILER HITCH ASSEMBLY FOR SUPPORT OF A BASKETBALL BACKBOARD OR NET ASSEMBLY

(76) Inventor: Paul T. Carey, 1996 Rivercrest Dr., Clarkston, WA (US) 99403

( * ) Notice: Subject to any disclaimer, the term of this patent is extended or adjusted under 35 U.S.C. 154(b) by 0 days.

(21) Appl. No.: 10/931,022

(22) Filed: Aug. 31, 2004

(65) Prior Publication Data

US 2005/0059514 A1    Mar. 17, 2005

Related U.S. Application Data

(60) Provisional application No. 60/502,292, filed on Sep. 12, 2003.

(51) Int. Cl.
*A63B 63/08* (2006.01)

(52) U.S. Cl. ..................................... 473/481; 473/479

(58) Field of Classification Search ................ 473/479, 473/481, 483, 492; 224/519
See application file for complete search history.

(56) References Cited

U.S. PATENT DOCUMENTS

| | | | |
|---|---|---|---|
| 4,789,156 A * | 12/1988 | D'Annunzio ................ | 473/481 |
| 5,316,290 A * | 5/1994 | Parr et al. .................... | 473/483 |
| 5,518,159 A * | 5/1996 | DeGuevara ................. | 224/488 |
| 5,664,717 A * | 9/1997 | Joder .......................... | 224/502 |
| 5,800,294 A * | 9/1998 | Naecker, Jr. ................ | 473/481 |
| 6,019,690 A * | 2/2000 | Parr et al. .................... | 473/481 |
| 6,199,735 B1 * | 3/2001 | Cothern et al. ............. | 224/509 |
| 6,626,773 B1 * | 9/2003 | Fair ........................... | 473/483 |
| 2002/0010041 A1 * | 1/2002 | Pearson ...................... | 473/479 |
| 2003/0094473 A1 * | 5/2003 | Moore ........................ | 224/519 |
| 2003/0171171 A1 * | 9/2003 | Fair ........................... | 473/483 |
| 2004/0023737 A1 * | 2/2004 | Fair ........................... | 473/483 |
| 2005/0059514 A1 * | 3/2005 | Carey ......................... | 473/492 |

* cited by examiner

*Primary Examiner*—Raleigh W. Chiu
(74) *Attorney, Agent, or Firm*—Clifford G. Frayne

(57) ABSTRACT

A support assembly cooperative with a vehicular trailer hitch for allowing the temporary erection of sports equipment such as a basketball post, backboard and net, or supports for volleyball or badminton, the support assembly comprising a T-shaped tubular support member having a horizontal member and a vertical member, the horizontal member having a tubular cross section cooperative with the internal diameter of a tubular trailer hitch for the slidable engagement thereof and the vertical tubular member being of a cross section and length sufficient enough to support a basketball backboard and net at a regulation height, in one embodiment, the vertical member being hinged at its mid section so as to allow transport of the assembly without having to remove it from the trailer hitch, and in another embodiment, the vertical member being telescopic and having a crank and pulley mechanism associated therewith in which the support assembly is transported in a non-telescopic mode and then raised to the regulation height of a basket for play.

3 Claims, 7 Drawing Sheets

TRAILER HITCH ASSEMBLY FOR SUPPORT OF A BASKETBALL BACKBOARD OR NET ASSEMBLY

RELATED APPLICATIONS

Applicant claims the benefit of provisional application Ser. No. 60/502,292, filed Sep. 12, 2003.

BACKGROUND OF THE INVENTION

1. Field of the Invention

The present invention relates to a support assembly for supporting a basketball post and basketball backboard or volleyball or badminton net in an erect orientation, and more particularly, to a support assembly cooperative with a vehicular mounted trailer hitch to permit the erection of the assembly wherever so desired.

2. Description of the Prior Art

The popularity of the sport of basketball is well documented. College and professional basketball dominate the sport scenes during the winter months and these games are played on a court within large arenas. On the local level, basketball is most often played in school gyms, YMCA's and other health club facilities that have sufficient space in which to position a basketball court. These facilities are not always available to the general public unless a membership is obtained or players pay a fee for usage thereof.

Outdoor courts and outdoor baskets are oftentimes erected in public parks for the public to utilize when the weather permits. In addition, basketball net and backboard assemblies have become popular recently in a kit form in which a base member is filled with ballast such as water or sand to maintain the basketball backboard and net in position. These assemblies can be seen on many driveways and at curbside where the individuals utilize the street as the basketball court.

In all of the preceding, the court is either in a fixed position or the basketball backboard and net assembly is of such a cumbersome design that it cannot easily be transported. Therefore there has been a need for the ability to easily transport and erect a basketball post supporting a basketball backboard and basketball net for use on a paved area which is not heavily used by vehicular traffic in order that one could develop one's dexterity in handling and shooting a basketball. Heretofore, no such assembly was available. Applicant's assembly utilizes a trailer hitch on a vehicle to support a basketball post, basketball backboard and basketball net, the assembly being easily erected once the vehicle is stationary at the desired location. The basketball post, backboard and net assembly is easily foldable for transportation by the vehicle to and from the desired location.

The same assembly with little or no modification can be used to support a volley ball or badminton net for play in a suitable area.

OBJECTS OF THE INVENTION

An object of the present invention is to provide for a novel support assembly cooperative with a vehicular trailer hitch which allows for the temporary erection of a basketball post, backboard and net assembly in an open area such as a vacant parking lot.

Another object of the present invention is to provide for a novel support assembly for the temporary erection of a basketball post, backboard and net assembly which is easily set up and easily broken down in a minimal amount of time.

A still further object of the present invention is to provide for a novel support assembly for sports which are cooperative with a variety of vehicular mounted trailer hitches.

A still further object of the present invention is to provide for a novel support assembly cooperative with a vehicular trailer hitch to permit the temporary erection of a basketball post, backboard and net assembly so as to increase the availability of a basketball area for playing, teaching, and/or introducing the sport to individuals.

A still further object of the present invention is to provide for a novel support assembly cooperative with a vehicular trailer hitch which allows for the temporary erection of a volleyball or badminton net assembly in an open area such as a vacant parking lot.

SUMMARY OF THE INVENTION

A support assembly cooperative with a vehicular trailer hitch for allowing the temporary erection of sports equipment such as a basketball post, backboard and net, or supports for volleyball or badminton, the support assembly comprising a T-shaped tubular support member having a horizontal member and a vertical member, the horizontal member having a tubular cross section cooperative with the internal diameter of a tubular trailer hitch for the slidable engagement thereof and the vertical tubular member being of a cross section and length sufficient enough to support a basketball backboard and net at a regulation height, in one embodiment, the vertical member being hinged at its mid section so as to allow transport of the assembly without having to remove it from the trailer hitch, and in another embodiment, the vertical member being telescopic and having a crank and pulley mechanism associated therewith in which the support assembly is transported in a non-telescopic mode and then raised to the regulation height of a basket for play.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
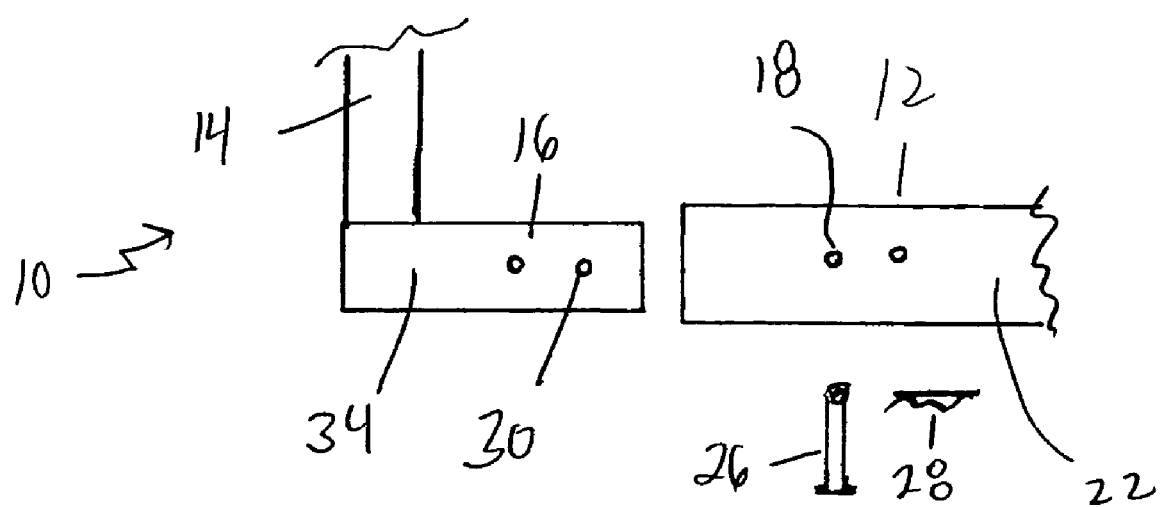
FIG. 1 is a partial side view of the support member cooperative with a trailer hitch.

FIG. 1 is a side view of a portion of the support member cooperating with a trailer hitch. The present invention comprises a support member 10 in cooperation with a vehicular trailer hitch 12 mounted to the underside of the rear bumper of a vehicle to support a basketball backboard and net in an erect orientation having regulation height. Support member 10 is a tubular member comprising a vertical tubular member 14 and a horizontal tubular member 16. Horizontal tubular member 16 is approximately 2 inches square in cross section so as to be slidably accommodatable within a standard two square inch inner diameter trailer hitch 12 normally found secured to the rear of a vehicle beneath the bumper. The trailer hitch 12 normally comes standard with aligned apertures 18 formed in opposing side walls 22. Apertures 18 are in alignment and accommodate a locking pin 26 which passes through and can be secured by a cotter pin 28 at one end. Horizontal arm member 16 is formed with apertures 30 in opposing side walls 34, apertures 30 being registerably alignable with the apertures 18 in trailer hitch 12 such that locking pin 26 can pass through the apertures and secure support member 10 to the trailer hitch with vertical tubular member 14 in a vertical orientation.

Figure 2:
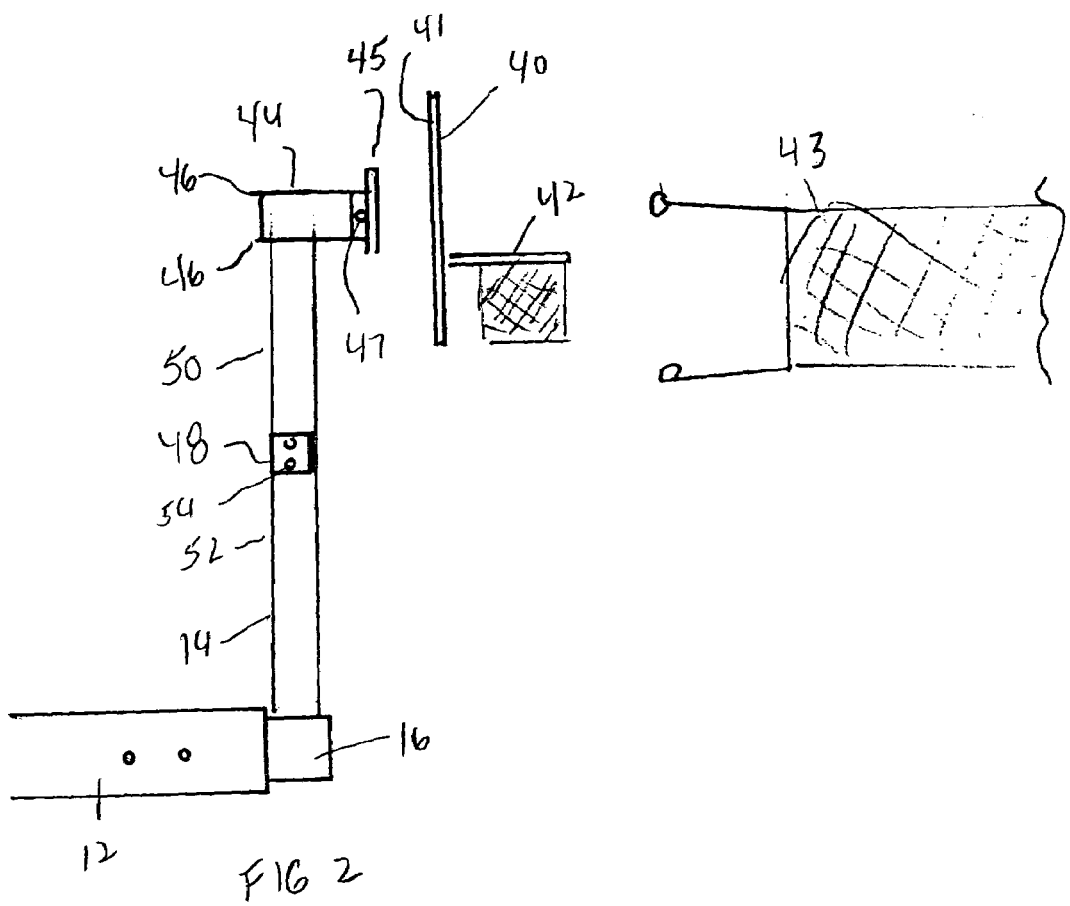
FIG. 2 is a side view of a first embodiment of the support member of the present invention in a full extended mode.
Figure 3:
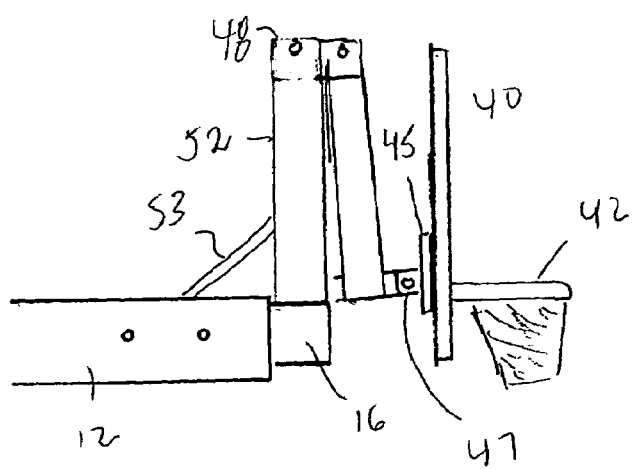
FIG. 3 is a side view of a first embodiment of the support member of the present invention in a folded mode.

In the folding embodiment illustrated in FIGS. 2 and 3, vertical tubular member 14 is square in cross sectional area and of a length sufficient to support a basketball backboard 40 and basketball net 42 or a volley ball or badminton net 43 at the regulation height of ten feet. The length of vertical tubular member 14 is such that the clearance from the ground to the trailer hitch 12 is factored into its height.

Figure 4:
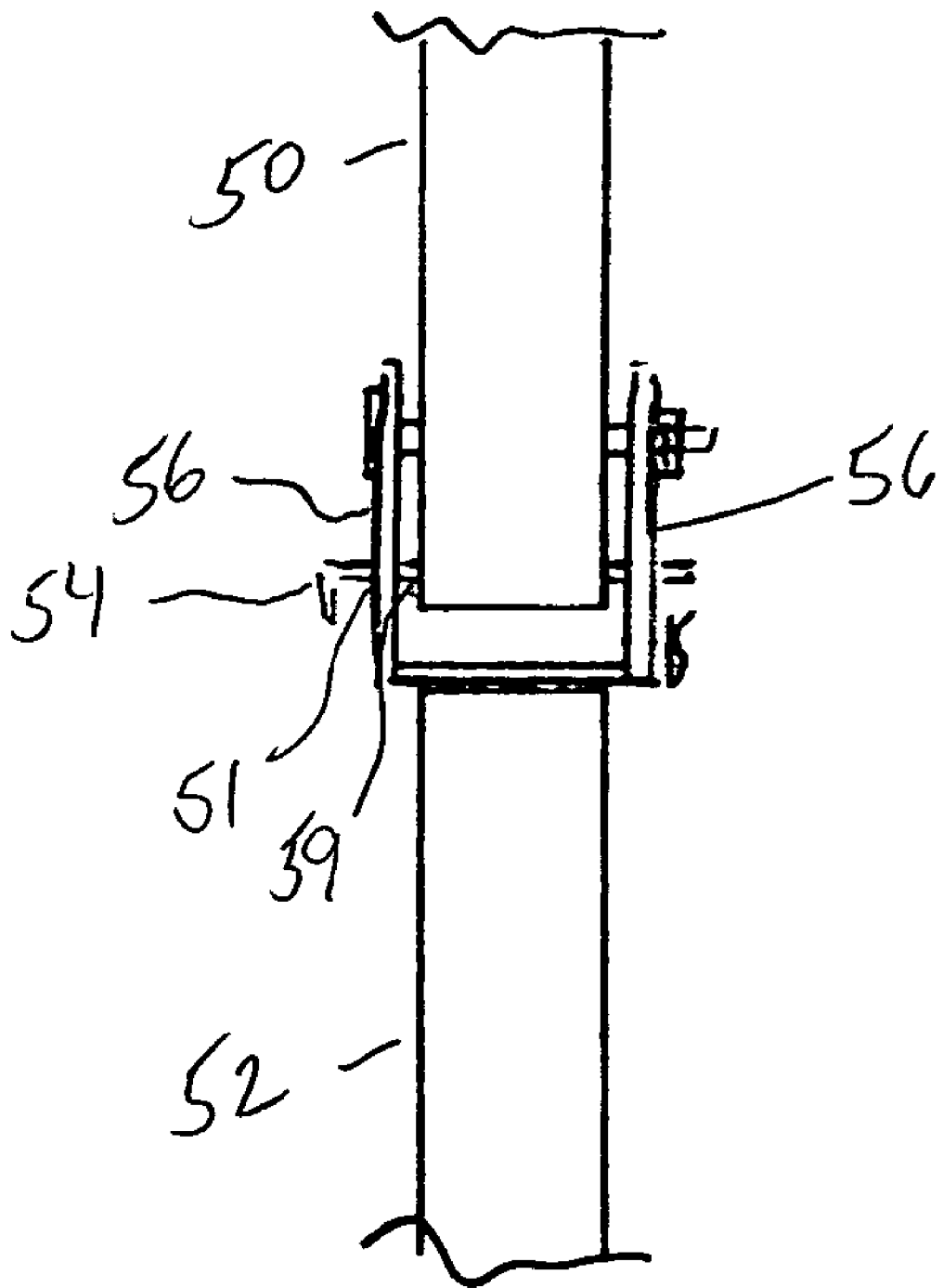
FIG. 4 is a detailed side view of a hinge mechanism for the first embodiment.

The basketball backboard 40 and attached basketball net 42 are secured to the upper end 44 of vertical tubular member 14 by a plurality of brackets 46 secured to a back plate 45 which backplate 45 is hingably secured 47 to the rear face 41 of backboard 40 allowing backboard 40 to be swiveled to a vertical position when in the folded transport mode of FIG. 3. Vertical tubular member 14 is also hinged 48 at its proximate midsection thereby defining the upper end 50 of vertical tubular member 14 and the lower end 52 of vertical tubular member 14 (See FIG. 4). In the erect upright position a locking pin 54 is cooperative with upstanding fingers 56 and an aperture 51 therethrough alignable with an aperture 59 in upper end 50 of vertical tubular member 14 to maintain the upper and lower ends 50 and 52 of vertical tubular member 14 in a secure and erect position. When play is discontinued, the pin 54 is removed and the upper member 50 together with backboard 40 and basketball net 42 are hingeably pivoted downwardly and backboard 40 is rotated on hinge 47 to a vertical position with basket 42 facing away from the rear of the vehicle. The non-erect support member 10 can then be secured by bungee cords or the like and the vehicle can be used in a normal course intended. Additional vertical support and integrity for vertical tubular member 14 may be achieved by the addition of an angled, gusset like support bar 53 between horizontal member 14 and lower ends 51 of vertical member 14. Alternatively, the additional integrity and support could be achieved by a plurality of bungee cords secured between vertical member 14 and the vehicle bumper.

Figure 5:
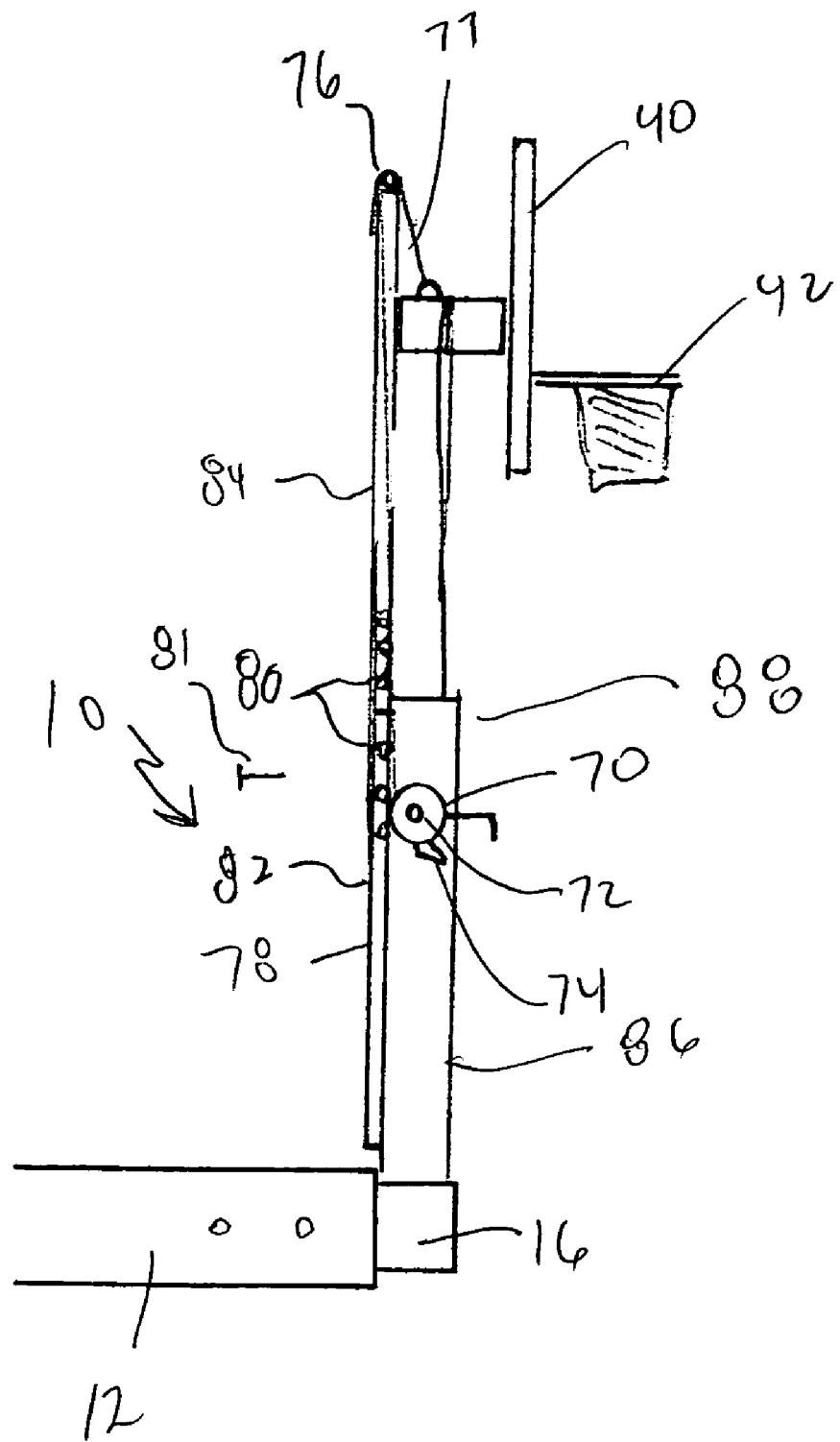
FIG. 5 is a side view of a second embodiment of the present invention in an extended mode.
Figure 6:
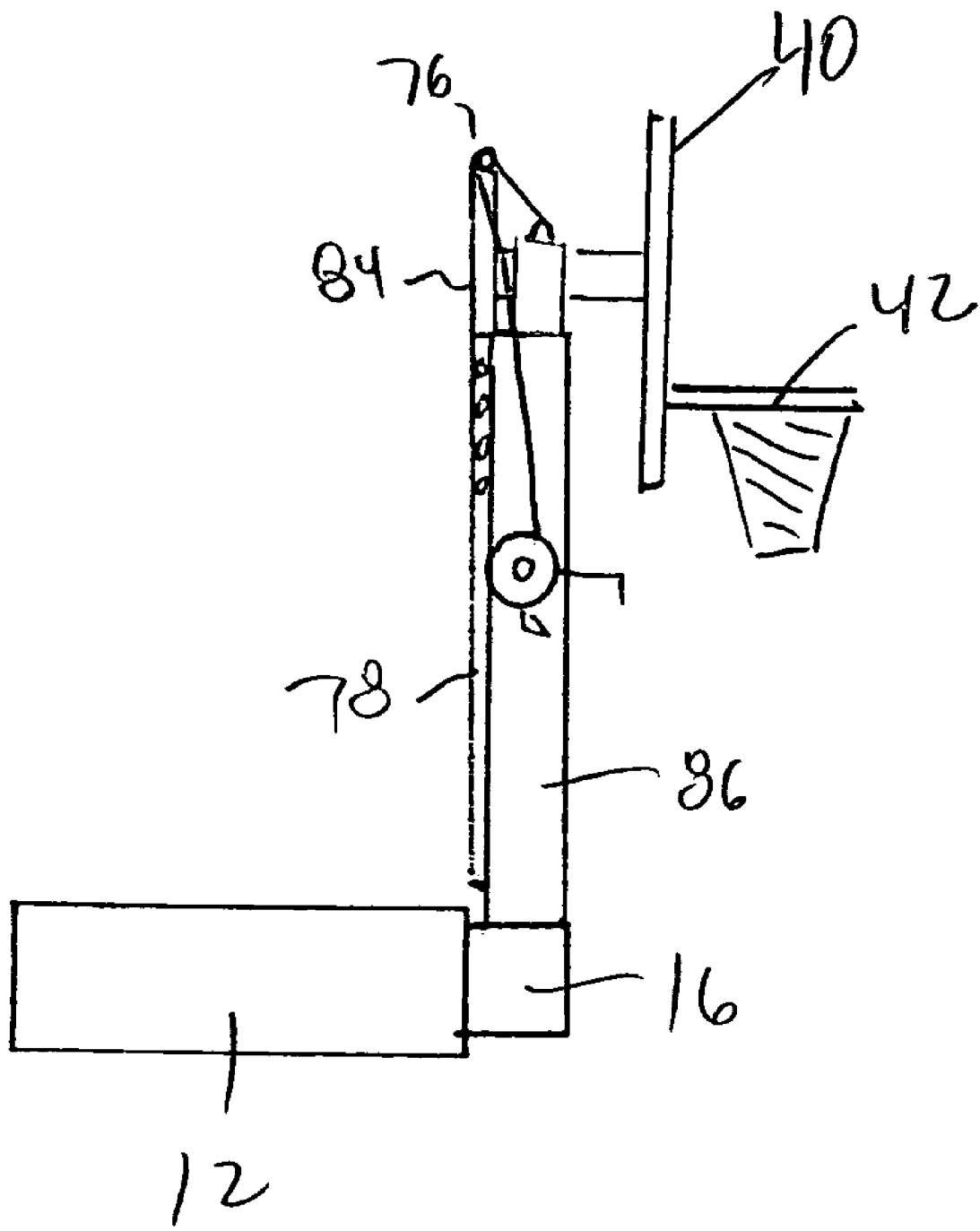
FIG. 6 is a side view of a second embodiment of the present invention in a non-extended mode.

In another embodiment of the support member illustrated in FIGS. 5 and 6, the support assembly 10 includes a crank 70, gear 72, ratchet 74 and pulley assembly 76. In this embodiment there is a horizontal tubular member 16 cooperative with the trailer hitch 12. However, there are two vertical support members. A first tubular member 78 is rectangular in cross section and approximately one inch square. This tubular member 78 is manually telescopic, having a plurality of alignable apertures 80 in first lower member 82 and upper member 84. Lower member 82 is secured to vertical tubular member 14. Positioned atop upper member 84 of vertical member 78 is a pulley 76 and cable means 77, secured to a crank 70, gear 72 and ratchet 74 assembly positioned on the lower end 86 of vertical support member 88. In operation, the upper member 84 of vertical support member 78 would be telescopically enclosed within the lower end 82 when not in use and the upper end of the support member 88 would be telescopically enclosed within the lower end 86. Upon reaching a location in which play was desired, the user would first extend the upper end 84 of telescopic member 78 and secure it in position with pin 81. Telescopic member 78 is meant to extend to a height greater than the regulation height of a basketball net in order to provide leverage to raise the basketball backboard and net. Once support member 78 was in position, the user would utilize crank 70, gear 72, and ratchet 74 to raise the upper member of support member 88 to which the backboard 40 and basketball net 42 were attached to the regulation height. Play would then commence. When play was finished, the user would reverse the process by releasing the ratchet 74 and lower upper member 88, backboard 40 and net 42 until upper member 88 was telescopically enclosed within lower member 86. The user would then release the pin 81, securing upper and lower members 82 and 84 of support member 78 and manually lower the upper member 84 telescopically into the lower member 82, while at the same time taking up the slack on the cable by means of the crank 70.

Figure 7:
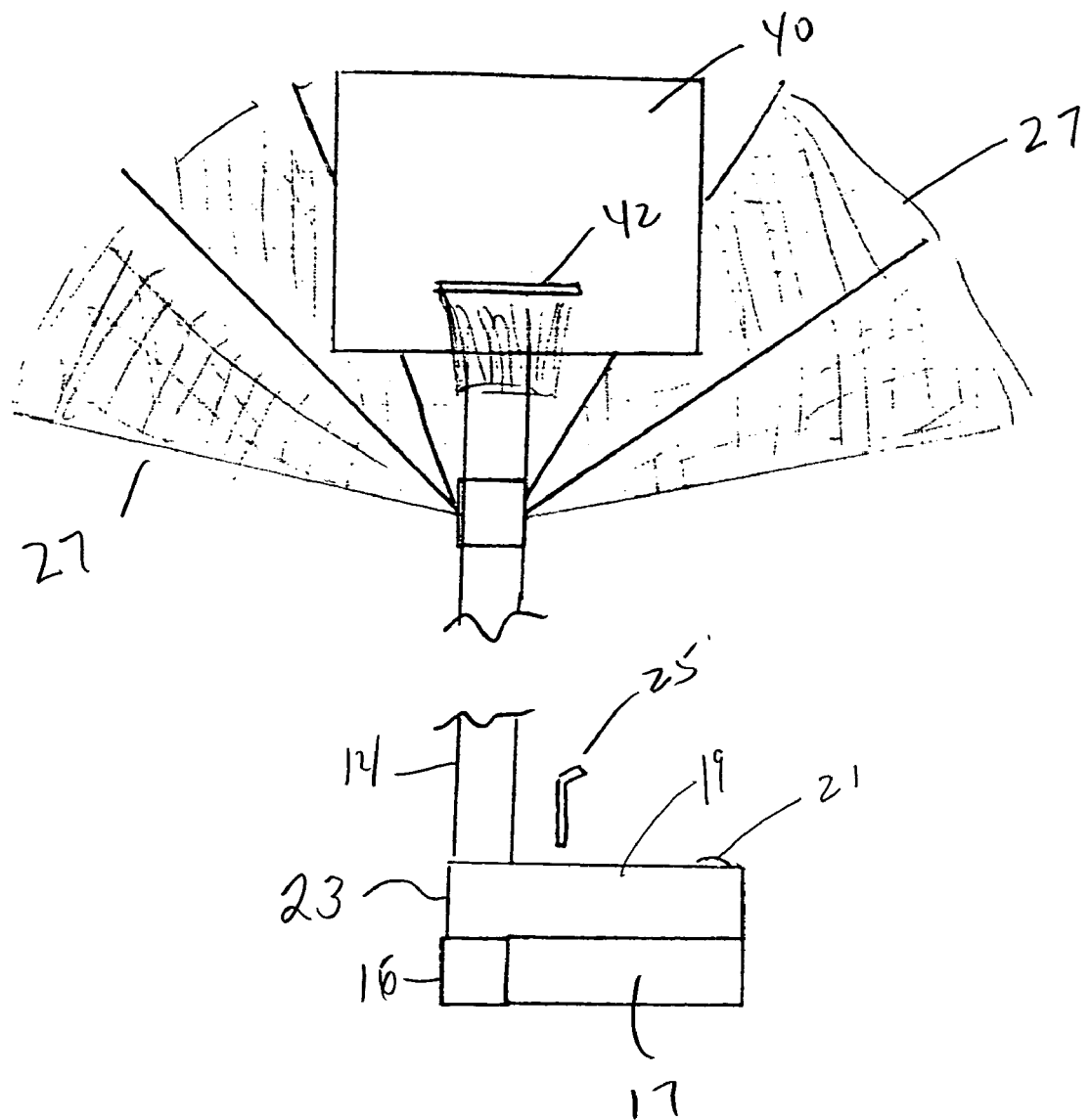
FIG. 7 is a front view of the support member of the present invention formed with a pivot member to allow access to the rear door of the vehicle.
Figure 8:
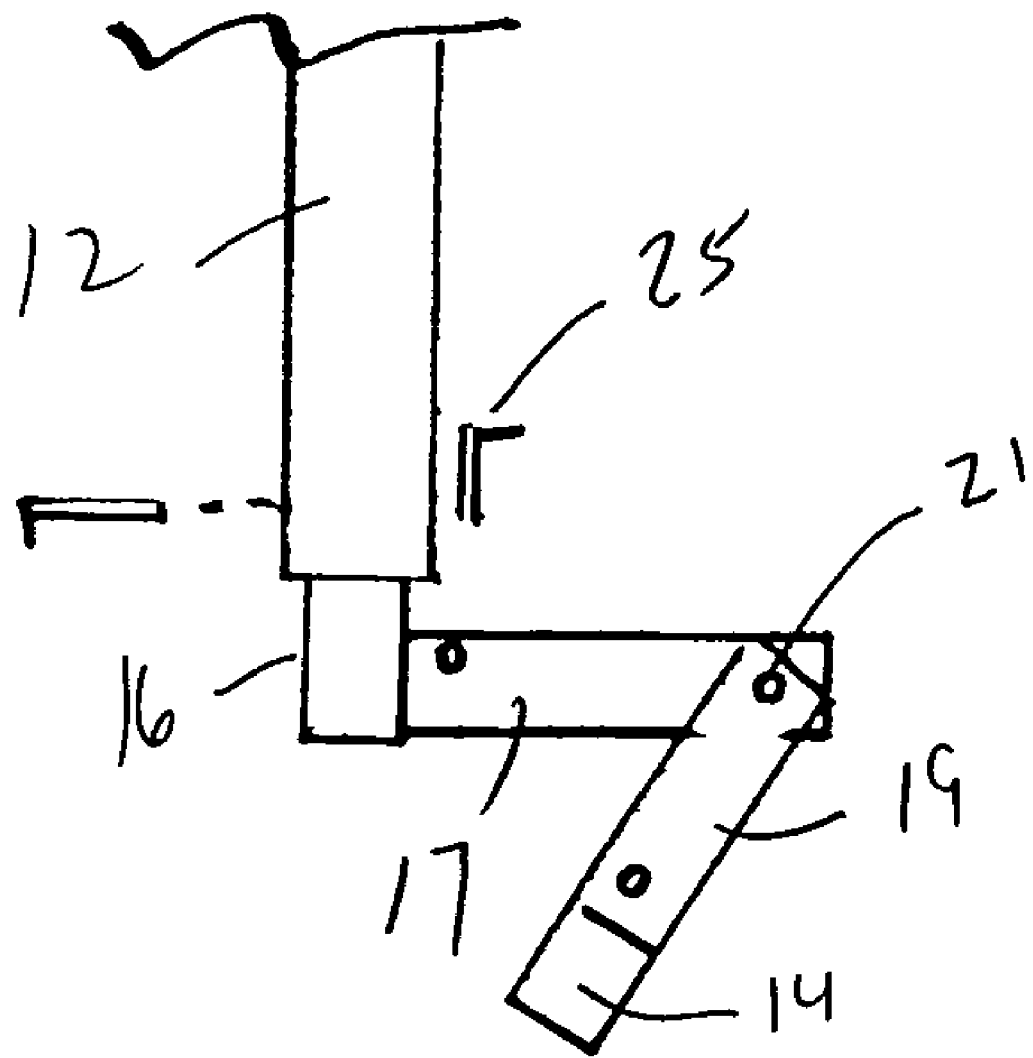
FIG. 8 is a top view of the pivot member.

An additional feature of the apparatus could include a horizontal pivot arm, FIGS. 7 and 8, which would allow for the assembly to be pivotally swung from alignment with the trailer hitch 12 to a position where the vertical support members are in alignment with the side of the vehicle, thus allowing access to the rear door or hatch of the vehicle.

FIG. 7 is a front view and FIG. 8 is a top view of a pivot member horizontal arm for use in either embodiment which allows for the erected basketball backboard assembly or net assembly to be pivoted out of the way in order that the user may gain access to the rear of the vehicle. In this embodiment, the horizontal tubular member 16 is slidably secured within the trailer hitch 12. Horizontal tubular member 16 is then secured to a second horizontal tubular member 17 at a right angle thereto forming an L-shaped member, horizontal tubular member 16 and perpendicular horizontal tubular member 17. Positioned on top of horizontal tubular member 17 is a third horizontal tubular member 19 pivotally secured to horizontal tubular member 17 at pivot point 21. At end 23 of horizontal tubular member 19 there is secured vertical member 14 of either the first or second embodiment type disclosed herein.

Second horizontal tubular member 17 and third horizontal tubular member 19 are maintained in coextensive position by a locking pin 25 which is securable through alignable apertures in the upper surface and lower surface of third horizontal tubular member 19 and the upper surface of second horizontal tubular member 17. In this configuration if while the game is in progress or the assembly remains secured to the vehicle in a non-erect mode, but access to the rear of the vehicle is desired, the locking pin 25 can be removed and the entire assembly swung outwardly about pivot point 21 to allow access to the rear of the vehicle.

One final aspect of the invention as an accessory thereto would be an expandable fan-shaped netting 27 which could be secured to vertical tubular member 14 or bracket 46 which could be expanded in a fan-like manner when play is in progress so as to prevent an errant shot from striking the vehicle and causing damage. The fan-like net 27 would fold to a vertical closed position and be slidably engageable on vertical tubular member 14 when not in use and raised an extended and spread in fan-like manner when in use.

The present invention has been described with respect to the exemplary embodiments thereof, it will be recognized by those of skill in the art that many modifications or changes can be achieved without departing from the spirit and scope of the invention. Therefore it is manifestly intended that the invention be limited only by the scope of the claims and the equivalence thereof.

I claim:

1. A portable vehicular mounted support assembly for the selective extension and nonextension of a sport assembly for the playing of basketball, volleyball, or badminton in a selected area, said portable support assembly being mounted to a vehicle hitch, said support assembly comprising:
   a horizontal tubular hitch member secured to the underside of a chassis of a vehicle, said tubular hitch member defining a rectangular bore, said tubular hitch member having aligned apertures formed on opposing side walls thereof for receipt of a locking pin;
   a first horizontal tubular support member having a cross section approximating said bore of said tubular hitch member secured to said chassis, said first horizontal tubular member slidably receivable within said tubular hitch member, said horizontal tubular support member having a first end having a plurality of apertures alignable with said apertures in said tubular hitch member secured to said chassis for receipt of said locking pin to maintain said first horizontal tubular support member within said tubular hitch member secured to said chassis of said vehicle, said first horizontal support member having a second end, said second end being in communication with a vertical tubular support member, said vertical tubular support member extending upwardly and terminating in an upper end having a bracket and back plate assembly secured thereto for the mounting of a basketball backboard and net or volleyball net or badminton net;
   said vertical tubular support member is rotatable away from said vehicle by means of a second horizontal tubular member perpendicularly fixedly secured to said first horizontal tubular member in the same plane thereof, said second horizontal tubular member having a third horizontal tubular member positioned on the upper surface thereof in pivotal relationship with said second horizontal tubular member, said third horizontal tubular member having said vertical tubular support member secured to the end thereof opposite said pivot point allowing said vertical tubular support member to be selectively rotated away from said trailer hitch;
wherein said vertical tubular support member is telescopic and comprised of:
   a first vertical portion and a second vertical portion slidably receivable in said first vertical portion, said second vertical portion elevated to an erect playing position and lowered to a non-erect storage position;
   a second vertical tubular member secured to said first vertical portion, said second vertical tubular member being telescopic, having a fixed lower end, an extendable upper end slidably receivable within said lower end, said extendable upper end of said second vertical tubular member having a pulley member secured thereto, said pulley member in cable communication with a winch member, handle member and ratchet member mounted on said first lower portion of said vertical tubular support member and said upper portion of said first vertical tubular support member allowing said second vertical portion to be elevated to a desired height and said upper tubular member of said first vertical tubular member to be winched to an erect position for play and lowered to a non-erect position for storage.

2. A portable vehicular mounted support assembly for the selective extension and non-extension of a sport assembly for the playing of basketball, volleyball, or badminton in a selected area, said portable support assembly being mounted to a vehicle hitch, said support assembly comprising:
   a horizontal tubular hitch member secured to the underside of a chassis of a vehicle, said tubular hitch member defining a rectangular bore, said tubular hitch member having aligned apertures formed on opposing side walls thereof for receipt of a locking pin;
   a first horizontal tubular support member having a cross section approximating said bore of said tubular hitch member secured to said chassis, said first horizontal tubular member slidably receivable within said tubular hitch member, said horizontal tubular support member having a first end having a plurality of apertures alignable with said apertures in said tubular hitch member secured to said chassis for receipt of said locking pin to maintain said first horizontal tubular support member within said tubular hitch member secured to said chassis of said vehicle, said first horizontal support member having a second end, said second end being in communication with a vertical tubular support member, said vertical tubular support member extending upwardly and terminating in an upper end having a bracket and back plate assembly secured thereto for the mounting of a basketball backboard and net or volleyball net or badminton net; said vertical tubular support member is telescopic and comprised of:
   a first vertical portion and a second vertical portion slidably receivable in said first vertical portion, said second vertical portion elevated to an erect playing position and lowered to a non-erect storage position;
   a second vertical tubular member secured to said first vertical portion, said second vertical tubular member being telescopic, having a fixed lower end, an extendable upper end slidably receivable within said lower end, said extendable upper end of said second vertical tubular member having a pulley member secured thereto, said pulley member in cable communication with a winch member, handle member and ratchet member mounted on said first lower portion of said vertical tubular support member and said upper portion of said first vertical tubular support member allowing said second vertical portion to be elevated to a desired height and said upper tubular member of said first vertical tubular member to be winched to an erect position for play and lowered to a non-erect position for storage.

3. The portable vehicular mounted support assembly in accordance with claim 2 wherein said vertical tubular support member is rotatable away from said vehicle by means of a second horizontal tubular member perpendicularly fixedly secured to said first horizontal tubular member in the same plane thereof, said second horizontal tubular member having a third horizontal tubular member positioned on the upper surface thereof in pivotal relationship with said second horizontal tubular member, said third horizontal tubular member having said vertical tubular support member secured to the end thereof opposite said pivot point allowing said vertical tubular support member to be selectively rotated away from said trailer hitch.

* * * * *